United States Patent
Ma et al.

(10) Patent No.: US 8,635,987 B2
(45) Date of Patent: Jan. 28, 2014

(54) ENGINE SPEED CONTROL SYSTEMS AND METHODS

(75) Inventors: Qi Ma, Farmington Hills, MI (US); Robert Douglas Shafto, New Hudson, MI (US); Ronald F. Lochocki, Jr., Ypsilanti, MI (US)

(73) Assignee: GM Global Technology Operations LLC

( * ) Notice: Subject to any disclaimer, the term of this patent is extended or adjusted under 35 U.S.C. 154(b) by 660 days.

(21) Appl. No.: 12/835,848

(22) Filed: Jul. 14, 2010

(65) Prior Publication Data

US 2011/0290214 A1    Dec. 1, 2011

Related U.S. Application Data

(60) Provisional application No. 61/350,186, filed on Jun. 1, 2010.

(51) Int. Cl.
*F02P 5/04* (2006.01)
*F02D 41/06* (2006.01)

(52) U.S. Cl.
USPC .................................................. 123/406.23

(58) Field of Classification Search
USPC ............. 123/406.23, 406.12, 406.13, 406.18, 123/406.35, 406.54, 406.58, 350, 352
See application file for complete search history.

(56) References Cited

U.S. PATENT DOCUMENTS

| | | | |
|---|---|---|---|
| 4,492,195 A * | 1/1985 | Takahashi et al. ....... | 123/339.11 |
| 4,958,516 A | 9/1990 | Stiles et al. | |
| 6,275,759 B1 | 8/2001 | Nakajima et al. | |
| 6,675,768 B2 * | 1/2004 | Kanai ..................... | 123/406.23 |
| 6,758,190 B2 | 7/2004 | Denz et al. | |
| 7,079,935 B2 | 7/2006 | Lewis et al. | |
| 7,130,731 B2 | 10/2006 | Itoh et al. | |
| 8,442,747 B2 * | 5/2013 | Ma et al. ....................... | 701/112 |
| 2006/0048734 A1 | 3/2006 | Kataoka et al. | |
| 2007/0163531 A1 | 7/2007 | Lewis et al. | |
| 2008/0275624 A1 | 11/2008 | Snyder | |
| 2009/0066337 A1 | 3/2009 | Gibson et al. | |
| 2009/0299586 A1 | 12/2009 | Miller et al. | |
| 2010/0038158 A1 | 2/2010 | Whitney et al. | |
| 2010/0211299 A1 | 8/2010 | Lewis et al. | |
| 2012/0245831 A1 | 9/2012 | Patterson et al. | |

FOREIGN PATENT DOCUMENTS

CN    101680414    3/2010

OTHER PUBLICATIONS

Ohata et al., "Benchmark Problem for Automotive Engine Control", SICE Annual Conference, Sep. 2007, pp. 1723-1726.
Rokusho et al., "Combined Feedforward and Feedback Control for Start-Up Engine Control", 27th Chinese Control Conference, Jul. 2008, pp. 562-565.

(Continued)

*Primary Examiner* — Hieu T Vo (57) ABSTRACT

An engine control system for an auto-stop/start vehicle, comprising: an actuator control module, a correction determination module, and a spark adjustment module. The actuator control module determines a target spark timing for a first time that is between a second time when engine cranking begins and a third time when a measured engine speed becomes greater than a predetermined engine speed after the second time. The correction determination module determines a spark timing correction for the first time based on a target engine speed and a measured engine speed. The spark adjustment module sets a spark timing for the first time based on the target spark timing and the spark timing correction.

20 Claims, 6 Drawing Sheets

(56) References Cited

OTHER PUBLICATIONS

Zhang et al., "Model-Based Cold-Start Speed Control Design for SI Engines", Proceedings of the 17th World Congress of the International Federation of Automatic Contol, Jul. 2008, pp. 1042-1047.
Saerens et al., "Minimization of the Fuel Consumption of a Gasoline Engine Using Dynamic Optimization", Applied Energy, vol. 86, Iss. 9, Sep. 2009, pp. 1582-1588.

U.S. Appl. No. 12/835,830, filed Jul. 14, 2010, Qi Ma et al.
U.S. Appl. No. 12/835,835, filed Jul. 14, 2010, Qi Ma et al.
U.S. Appl. No. 12/835,842, filed Jul. 14, 2010, Qi Ma et al.
U.S. Appl. No. 12/835,856, filed Jul. 14, 2010, Qi Ma et al.
U.S. Appl. No. 12/835,942, filed Jul. 14, 2010, Qi Ma et al.
U.S. Appl. No. 12/835,951, filed Jul. 14, 2010, Qi Ma et al.

* cited by examiner

ENGINE SPEED CONTROL SYSTEMS AND METHODS

CROSS-REFERENCE TO RELATED APPLICATIONS

This application claims the benefit of U.S. Provisional Application No. 61/350,186, filed on Jun. 1, 2010. The disclosure of the above application is incorporated herein by reference in its entirety.

This application is related to U.S. patent application Ser. Nos. 12/835,830 filed on Jul. 14, 2010, 12/835,835 filed on Jul. 14, 2010, 12/835,842 filed on Jul. 14, 2010, 12/835,856 filed on Jul. 14, 2010, 12/835,942 filed on Jul. 14, 2010, and 12/835,951 filed on Jul. 14, 2010. The disclosures of the above applications are incorporated herein by reference in their entirety.

FIELD

The present invention relates to internal combustion engines and more particularly to engine speed control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture may be initiated by, for example, injection of the fuel or spark provided by a spark plug.

An engine control module (ECM) controls the torque output of the engine. Under some circumstances, the ECM may shut down the engine between vehicle startup (e.g., key ON) and vehicle shutdown (e.g., key OFF). The ECM may selectively shut down the engine, for example, to increase fuel efficiency (i.e., reduce fuel consumption). The ECM may start the engine at a later time.

SUMMARY

An engine control system for an auto-stop/start vehicle, comprising: an actuator control module, a correction determination module, and a spark adjustment module. The actuator control module determines a target spark timing for a first time that is between a second time when engine cranking begins and a third time when a measured engine speed becomes greater than a predetermined engine speed after the second time. The correction determination module determines a spark timing correction for the first time based on a target engine speed and a measured engine speed. The spark adjustment module sets a spark timing for the first time based on the target spark timing and the spark timing correction.

An engine control method for an auto-stop/start vehicle, comprising: determining a target spark timing for a first time that is between a second time when engine cranking begins and a third time when a measured engine speed becomes greater than a predetermined engine speed after the second time; determining a spark timing correction for the first time based on a target engine speed and a measured engine speed; and setting a spark timing for the first time based on the target spark timing and the spark timing correction.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine control module (ECM) may selectively start and shut down an engine of a vehicle. For example only, the ECM may start and shut down the engine when commanded to do so by a user, such as via a key or a button. A key cycle may refer to a period between a first time when the user commands vehicle startup and a second time when the user commands vehicle shutdown.

The ECM may selectively shut down and start the engine during a key cycle under some circumstances. An auto-stop event refers to an engine shutdown performed during a key cycle. The ECM may selectively initiate an auto-stop event, for example, to decrease fuel consumption. An auto-start event refers to an engine startup performed after an auto-stop event during a key cycle.

While the engine is shut down, pressure within an intake manifold of the engine approaches and may reach barometric pressure. With the pressure at or near barometric pressure when the engine is started, an air per cylinder (APC) may be at or near an APC achieved when a throttle valve is in a wide open throttle (WOT) position.

During engine startup, the ECM may set a spark timing to a maximum braking torque (MBT) spark timing to prevent the engine from stalling. The combination of the pressure being at or near barometric pressure and the spark timing being set to the MBT spark timing causes the engine speed to overshoot a predetermined engine speed. Overshooting the predetermined engine speed during engine startup may be referred to as engine flare. A user may expect engine flare during engine startup.

The ECM determines a target engine speed for increasing the engine speed up to the predetermined engine speed during engine startup. The ECM monitors the engine speed and determines a spark timing correction to adjust the engine speed to the target engine speed. More specifically, the ECM determines the spark timing correction based on a difference between the engine speed and the target engine speed. The ECM determines a target spark timing during engine startup and adjusts the target spark timing based on the spark timing correction. Adjusting the target spark timing based on the spark timing correction may minimize overshoot and engine flare. Adjusting the target spark timing based on the spark timing correction may even prevent overshoot and engine flare.

Figure 1:
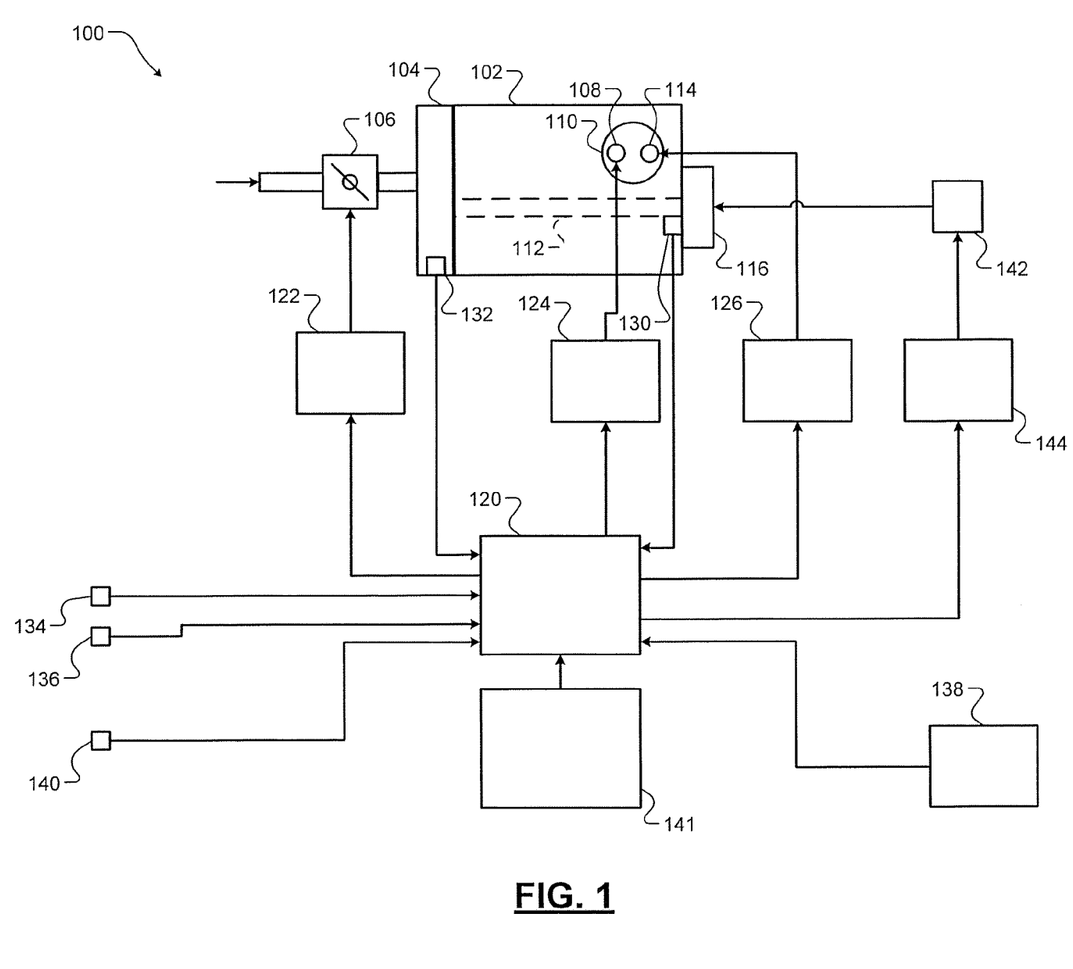
FIG. 1 is a functional block diagram of an exemplary engine system according to the principles of the present disclosure.

Referring now to FIG. 1, a functional block diagram of an exemplary engine system 100 is presented. An engine 102 generates drive torque for a vehicle. While the engine 102 is shown and will be discussed as a spark-combustion internal combustion engine (ICE), the engine 102 may include another suitable type of engine, such as a compression-combustion ICE. One or more electric motors (or motor-generators) may additionally generate drive torque.

Air is drawn into the engine 102 through an intake manifold 104. Airflow into the engine 102 may be varied using a throttle valve 106. One or more fuel injectors, such as fuel injector 108, mix fuel with the air to form an air/fuel mixture. The air/fuel mixture is combusted within cylinders of the engine 102, such as cylinder 110. Although the engine 102 is depicted as including one cylinder, the engine 102 may include more than one cylinder.

The cylinder 110 includes a piston (not shown) that is mechanically linked to a crankshaft 112. One combustion cycle within the cylinder 110 may include four phases: an intake phase, a compression phase, a combustion (or expansion) phase, and an exhaust phase. During the intake phase, the piston moves toward a bottommost position and draws air into the cylinder 110. During the compression phase, the piston moves toward a topmost position and compresses the air or air/fuel mixture within the cylinder 110.

During the combustion phase, spark from a spark plug 114 ignites the air/fuel mixture. The combustion of the air/fuel mixture drives the piston back toward the bottommost position, and the piston drives rotation of the crankshaft 112. Resulting exhaust gas is expelled from the cylinder 110 to complete the exhaust phase and the combustion event. A flywheel 116 is attached to and rotates with the crankshaft 112. The engine 102 outputs torque to a transmission (not shown) via the crankshaft 112.

An engine control module (ECM) 120 controls the torque output of the engine 102. The ECM 120 controls the throttle valve 106, the fuel injector 108, and the spark plug 114 via a throttle actuator module 122, a fuel actuator module 124, and a spark actuator module 126, respectively. More specifically, the ECM 120 controls opening of the throttle valve 106, fuel injection amount and timing, and spark timing. While not shown, the ECM 120 may also control other engine actuators, such as one or more camshaft phasers, an exhaust gas recirculation (EGR) valve, a boost device (e.g., a turbocharger or a supercharger), and/or other suitable engine actuators.

A crankshaft position sensor 130 monitors rotation of the crankshaft 112 and outputs a crankshaft position signal based on rotation of the crankshaft 112. The crankshaft position sensor 130 may also measure direction of rotation of the crankshaft 112. The crankshaft position sensor 130 may output a direction signal indicating the direction of rotation, or the crankshaft position sensor 130 may indicate the direction of rotation via the crankshaft position signal. The crankshaft position may be used, for example, to determine rotational speed of the crankshaft 112 (e.g., in revolutions per minute or RPM). The rotational speed of the crankshaft 112 may be referred to as engine speed. A manifold absolute pressure sensor 132 measures pressure within the intake manifold 104 and generates a manifold absolute pressure (MAP) signal based on the pressure.

The ECM 120 may control the torque output of the engine 102 based on one or more driver inputs, such as an accelerator pedal position (APP), a brake pedal position (BPP), and/or other suitable driver inputs. An APP sensor 134 measures position of an accelerator pedal (not shown) and generates an APP signal based on the position of the accelerator pedal. A BPP sensor 136 measures position of a brake pedal (not shown) and generates a BPP signal based on the position of the brake pedal.

The engine system 100 may include one or more other sensors 138, such as a mass air flowrate (MAF) sensor, an intake air temperature (IAT) sensor, an engine coolant temperature sensor, an engine oil temperature sensor, and/or other suitable sensors. The ECM 120 may control the torque output of the engine 102 based on one or more measured parameters. The ECM 120 may communicate with one or more other modules, such as a transmission control module (TCM) 141.

A user may input vehicle startup and vehicle shutdown commands via an ignition system 140 (collectively illustrated as ignition). For example only, the user may input vehicle startup and vehicle shutdown commands by turning a key, pressing a button, or in another suitable manner. A period between a time when a vehicle startup command is received and a later time when a vehicle shutdown command is received may be referred to as a key cycle.

When a vehicle startup command is received, the ECM 120 may start the engine 102. More specifically, the ECM 120 may activate and engage a starter 142 via a starter actuator module 144 when a vehicle startup command is received. The starter 142 drives rotation of the crankshaft 112. The starter 142 may engage, for example, the flywheel 116. The ECM 120 selectively begins supplying fuel to the engine 102 and initiating combustion as the starter 142 rotates the crankshaft 112. The ECM 120 disables fuel and spark to the engine 102 when a vehicle shutdown command is received.

The ECM 120 may selectively shut down the engine 102 during a key cycle (i.e., before a vehicle shutdown command is received) under some circumstances. An auto-stop event refers to shutting down the engine 102 during a key cycle. For example only, the ECM 120 may selectively perform an auto-stop event during a key cycle when a user applies pressure to the brake pedal and/or when one or more other suitable conditions are satisfied. Shutting down the engine 102 under such conditions may decrease fuel consumption.

The ECM 120 may later selectively terminate the auto-stop event and restart the engine 102. An auto-start event refers to starting the engine 102 after an auto-stop event during a key cycle. For example only, the ECM 120 may perform an auto-start event when the user releases the pressure from the brake pedal, when the user applies pressure to the accelerator pedal, and/or when one or more other suitable conditions are satisfied.

The MAP may approach barometric pressure when the engine 102 is shut down. When engine startup is initiated (e.g., for an auto-start event or for a vehicle startup command), the MAP may therefore be approximately equal to a MAP that may be present when the throttle valve 106 is in a wide open throttle (WOT) position.

During engine startup, the ECM 120 may set the spark timing to approximately a spark timing at which a maximum braking torque (MBT) will be produced under the operating conditions. This spark timing may be referred to as an MBT spark timing. Setting the spark timing to the MBT spark timing during engine startup may ensure that a significant amount of torque is produced and that the engine 102 does not sputter or stall.

Figure 2:
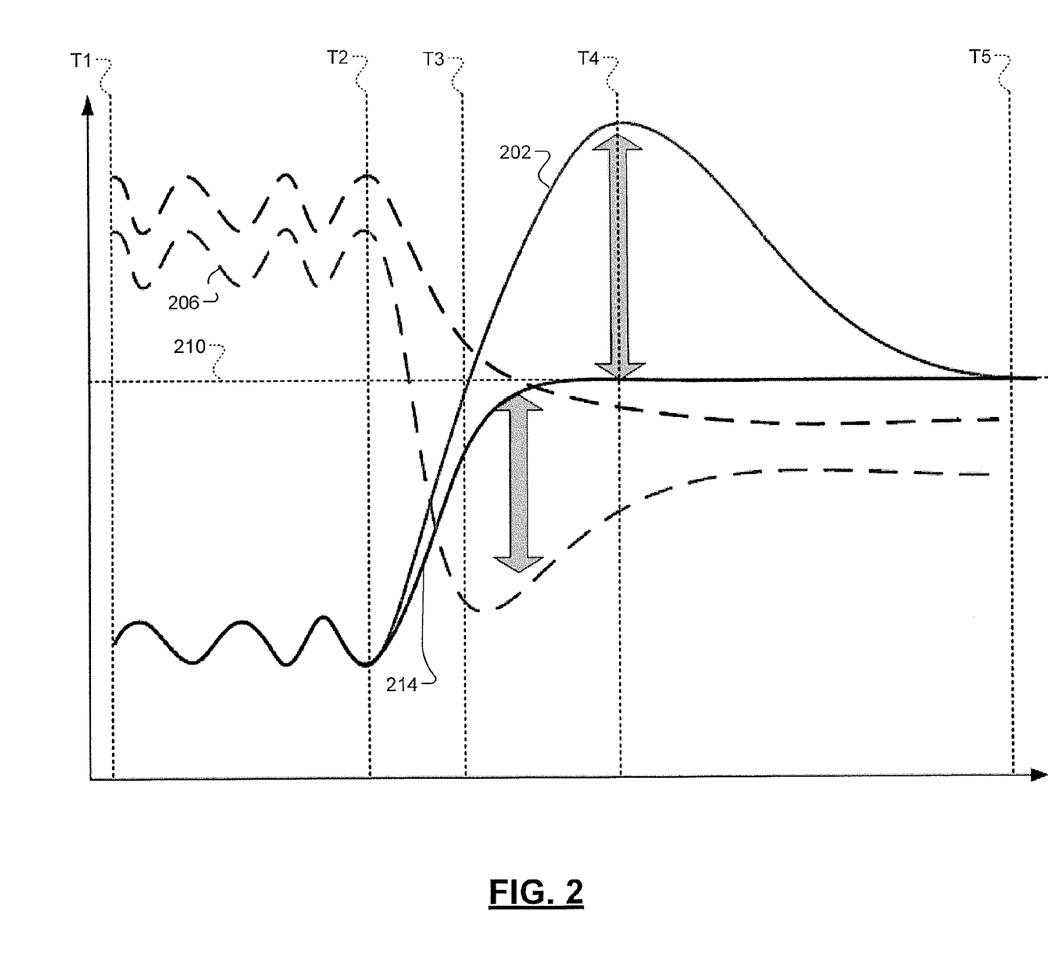
FIG. 2 includes exemplary graphs of engine speed and manifold absolute pressure (MAP) as functions of time according to the principles of the present disclosure.

Referring now to FIG. 2, exemplary graphs of engine speed and MAP as functions of time are presented. Exemplary trace 202 tracks the engine speed. Exemplary trace 206 tracks the MAP. An engine startup event is initiated at approximately time T1. The starter 142 drives rotation of the crankshaft 112. A first combustion event within the engine 102 occurs at approximately time T2, and the engine speed 202 increases toward a predetermined speed as torque is produced.

Exemplary line 210 illustrates the predetermined engine speed. For example only, the predetermined engine speed 210 may be a predetermined idle speed, such as approximately 700 RPM-900 RPM. The MAP being at or near barometric pressure in combination with the spark timing at approximately the MBT spark timing during engine startup may cause the engine speed 202 to overshoot the predetermined engine speed 210. The engine speed 202 exceeds the predetermined engine speed 210 at approximately time T3, and the engine speed 202 increases until approximately time T4.

The engine speed 202 begins decreasing at approximately time T4 and may decrease to approximately the predetermined engine speed 210 under some circumstances. The engine speed 202 may reach the predetermined engine speed 210 at approximately time T5. Thus, the engine speed 202 overshoots the predetermined engine speed 210 from approximately time T3 to approximately time T5. Overshooting the predetermined engine speed 210 during an engine startup may be referred to as engine flare.

In some vehicles, the transmission (and a torque transmission device, such as a torque converter) may be engaged to transmit torque between the engine 102 and a driveline (not shown) when the engine 102 is started pursuant to an auto-start event. Engine flare under such circumstances may cause vehicle acceleration or deceleration, and the acceleration or deceleration may be experienced within a passenger cabin of the vehicle. Engine flare may also cause the MAP 206 to decrease as the engine speed 202 overshoots the predetermined engine speed 210.

The ECM 120 of the present disclosure minimizes engine flare when the engine 102 is started. Exemplary trace 214 tracks engine speed as controlled by the ECM 120 to prevent engine flare and overshoot. The ECM 120 of the present disclosure may smoothly increase the engine speed 214 up to the predetermined engine speed 210 during engine startup to minimize engine flare and to minimize overshoot during engine startup.

Referring again to FIG. 1, the ECM 120 determines targets for opening of the throttle valve 106 (e.g., throttle position or throttle opening area), air fuel ratio (AFR), and the spark timing during an engine startup. The ECM 120 also determines a target engine speed based on a predetermined profile to be followed during the engine startup. The predetermined profile may be similar to the profile of the engine speed 214 of FIG. 2 or another suitable profile that may smoothly transition the engine speed up to the predetermined engine speed during an engine startup.

The ECM 120 determines a spark correction based on the target engine speed. More specifically, the ECM 120 determines the spark correction based on a difference between the target engine speed and the measured engine speed. The ECM 120 adjusts the target spark timing based on the spark correction and sets the spark timing to the adjusted spark timing. In this manner, the ECM 120 controls the engine speed to track the predetermined profile and minimizes overshoot during engine startup.

Figure 3:
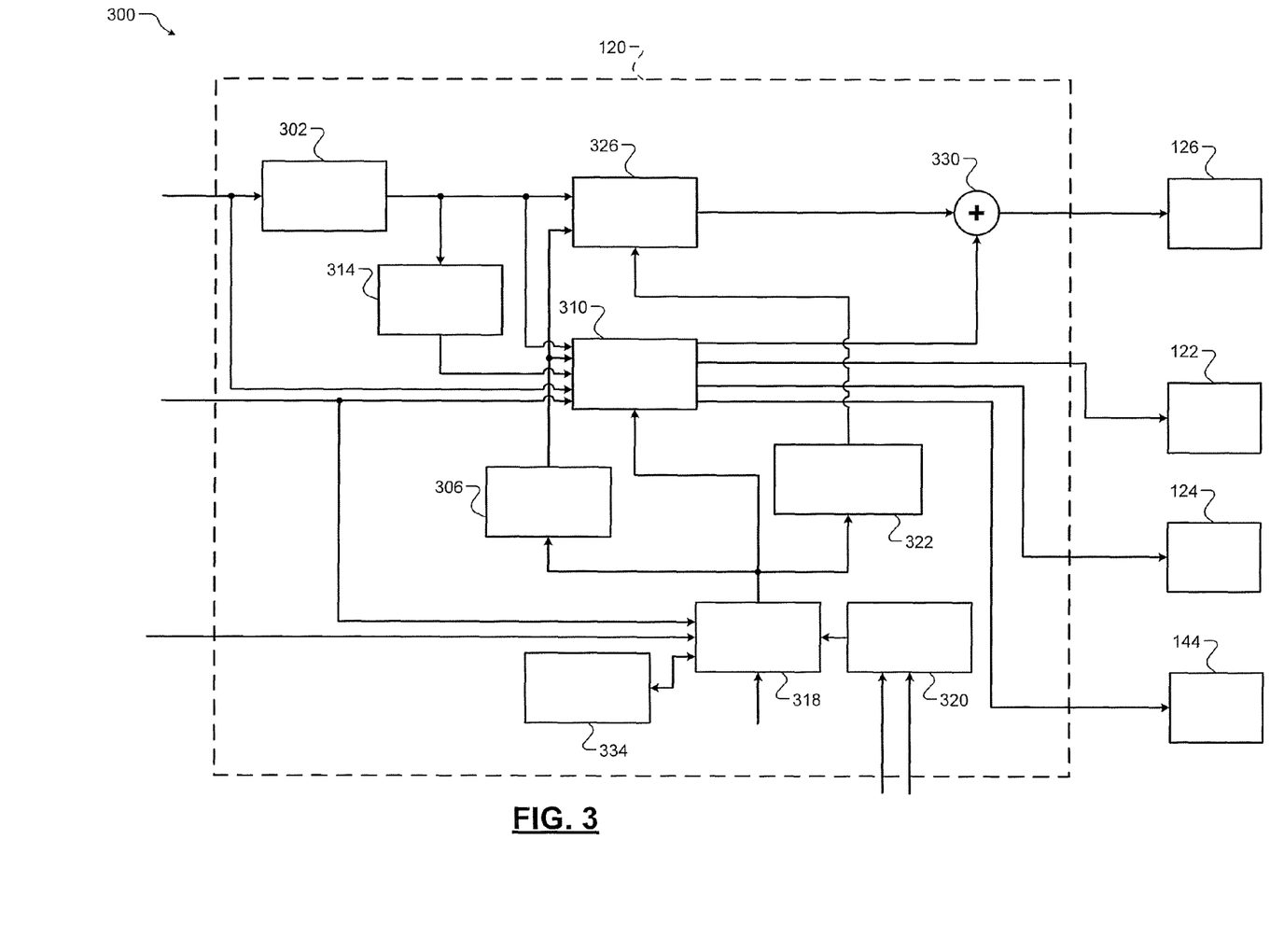
FIG. 3 is a functional block diagram of an exemplary engine control system according to the principles of the present disclosure.

Referring now to FIG. 3, a functional block diagram of an exemplary engine control system 300 is presented. The ECM 120 may include an engine speed determination module 302, a target engine speed module 306, an actuator control module 310, an engine load estimation module 314, a mode control module 318, and an auto-stop/start module 320. The ECM 120 may also include a correction disabling module 322, a correction determination module 326, and a spark timing adjustment module 330.

The engine speed determination module 302 determines the engine speed. The engine speed determination module 302 may determine the engine speed based on the crankshaft position signal. For example only, the crankshaft position sensor 130 may generate a pulse in the crankshaft position signal when a tooth of an N-toothed wheel (e.g., the flywheel 116) passes the crankshaft position sensor 130. The engine speed determination module 302 may determine the engine speed based on a period between two or more of the pulses.

The target engine speed module 306 determines the target engine speed based on a control mode. The target engine speed module 306 may determine the target engine speed further based on a driver torque request, the engine coolant temperature, the oil temperature, and/or one or more other suitable parameters. The driver torque request may be determined based on the APP, the BPP, cruise control inputs, and/or one or more other driver inputs.

The actuator control module 310 determines a target spark timing, a target throttle opening, and a target fueling. The actuator control module 310 may determine the target spark timing, the target throttle opening, and/or the target fueling based on the target engine speed, the engine speed, and the control mode. The actuator control module 310 may determine the target spark timing, the target throttle opening, and/or the target fueling further based on an engine load, the MAP, and/or one or more other parameters. For example only, a mass of air per cylinder (APC) for a given combustion event may be determined based on the MAP. The actuator control module 310 may set the target fueling for the combustion event based on the APC to achieve a stoichiometric air/fuel mixture. The engine load estimation module 314 may estimate the engine load based on the engine speed and/or one or more suitable parameters, such as transmission load. Transmission load may refer to the load (e.g., torque) imposed on the engine 102 via the transmission.

Figure 4:
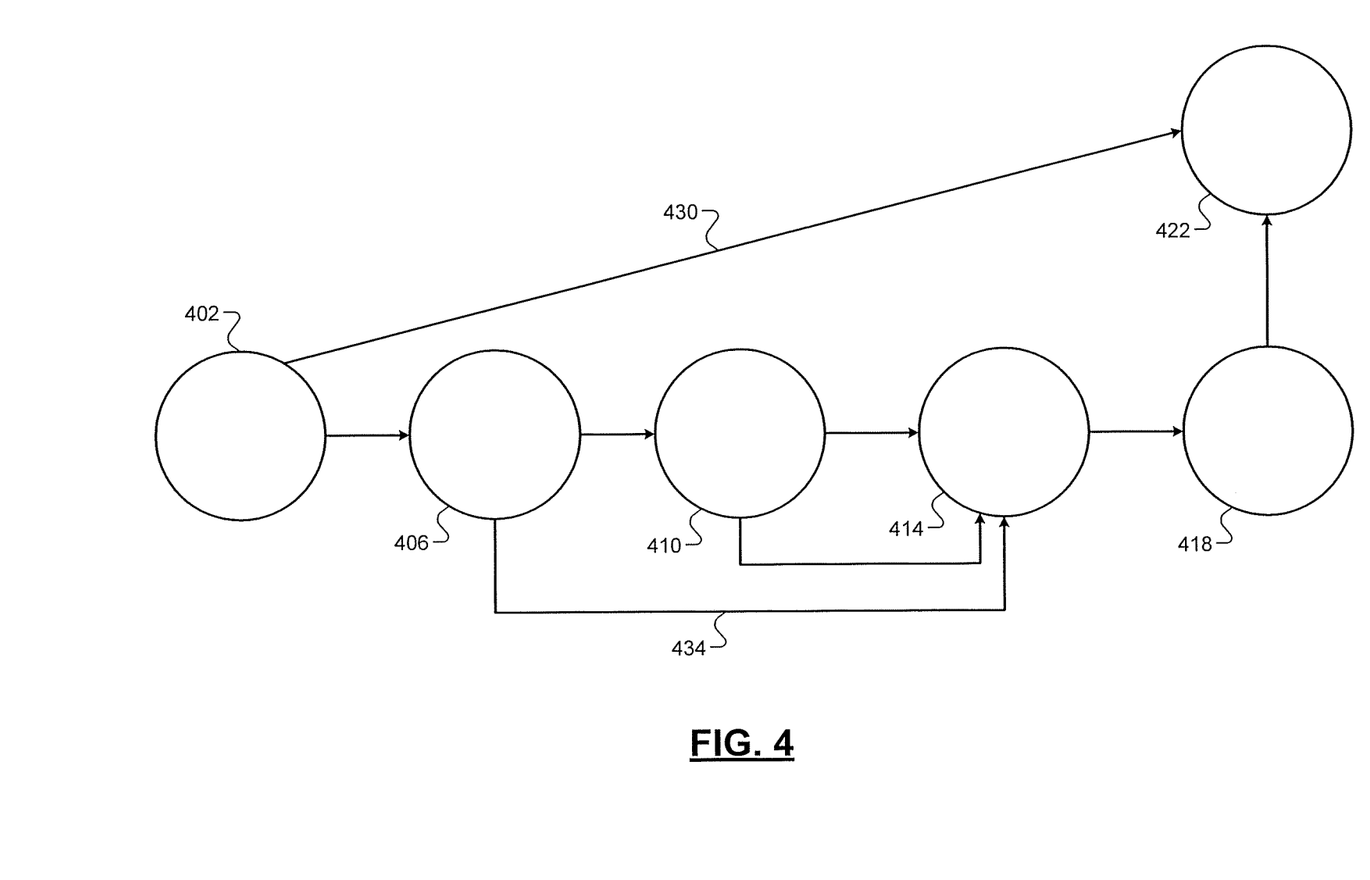
FIG. 4 is an exemplary mode-flow diagram according to the principles of the present disclosure.

The mode control module 318 may provide the control mode to the actuator control module 310. FIG. 4 includes an exemplary mode-flow diagram. For example only, as shown in the example of FIG. 4, the control modes may include a throttle holding mode 402, a manifold refill mode 406, a MAP holding mode 410, a choking mode 414, a cranking airflow mode 418, and a speed control mode 422. The mode control module 318 may set the control mode based on the engine speed, the MAP, auto-stop/start commands, and one or more other suitable parameters.

The auto-stop/start module 320 may selectively generate an auto-stop command during a key cycle. For example only, the auto-stop/start module 320 may generate an auto-stop command when the APP is approximately equal to a predetermined zero APP and the BPP is greater than a predetermined zero BPP while the vehicle speed is less than a predetermined speed. The predetermined zero APP may correspond to the APP when no pressure is being applied to the accelerator pedal. The predetermined zero BPP may correspond to the BPP when no pressure is being applied to the brake pedal.

The mode control module 318 initiates an auto-stop event when an auto-stop command is generated. The mode control module 318 may initiate the auto-stop event by setting the control mode to the throttle holding mode 402. The actuator control module 310 disables the provision of fuel and spark to the engine 102 when the control mode is set to the throttle holding mode 402. The actuator control module 310 may set the target throttle opening to a first predetermined throttle opening when the control mode is set to the throttle holding mode 402. For example only, the first predetermined throttle opening may include a predetermined idle throttle opening or another suitable throttle opening. Disabling the provision of fuel and spark to the engine 102 allows the engine speed to decrease toward zero as no torque is being produced by the engine 102.

The mode control module 318 may maintain the control mode in the throttle holding mode 402 until the engine speed reaches zero. The engine 102 may be deemed shut down when the engine speed is equal to zero. The engine speed may be deemed equal to zero when the engine speed is less than a predetermined zero speed. For example only, the predetermined zero speed may be approximately 30-50 RPM.

During the throttle holding mode 402 (i.e., before the engine speed reaches zero), the mode control module 318 may selectively transition the control mode to the speed control mode 422. Such a transition from the throttle holding mode 402 to the speed control mode 422 is illustrated in the example of FIG. 4 by line 430. For example only, the mode control module 318 may transition the control mode to the speed control mode 422 when the auto-stop/start module 320 generates an auto-start command.

The auto-stop/start module 320 may generate an auto-start command, for example, when the BPP approaches or reaches the predetermined zero BPP and/or when the APP is greater than the predetermined zero APP during the throttle holding mode 402. The target engine speed module 306 may set the target engine speed to the predetermined engine speed or to another speed when the control mode is set to the speed control mode 422.

The mode control module 318 may selectively transition the control mode to the manifold refill mode 406 when the engine speed reaches zero during the throttle holding mode 402. When the control mode is set to the manifold refill mode 406, the actuator control module 310 may set the target throttle opening to a second predetermined throttle opening. For example only, the second predetermined throttle opening may include the WOT opening or another suitable throttle opening that allows the MAP to increase toward barometric pressure. The second predetermined throttle opening is greater than the first predetermined throttle opening.

The mode control module 318 starts a timer in a timer module 334 when the mode control module 318 transitions the control mode from the throttle holding mode 402 to the manifold refill mode 406. The timer tracks the period elapsed since the control mode was set to the manifold refill mode 406. During the manifold refill mode 406, the mode control module 318 may selectively transition the control mode to the choking mode 414 when the timer is less than a predetermined period. For example only, the mode control module 318 may transition the control mode to the choking mode 414 when the auto-stop/start module 220 generates an auto-start command. In this manner, if the engine 102 should be auto-started when the control mode has been set to the manifold refill mode 406 for less than the predetermined period, the MAP holding mode 410 may be skipped in favor of the choking mode 414. Such a transition from the manifold refill mode 406 to the choking mode 414 is illustrated in the example of FIG. 4 by line 434. The choking mode 414 is discussed further below. For example only, the period may be approximately 6 seconds.

If the MAP exceeds a first predetermined pressure during the manifold refill mode 406, the mode control module 318 may transition the control mode to the MAP holding mode 410. For example only, the first predetermined pressure may be a predetermined amount or percentage less than barometric pressure.

When the control mode is set to the MAP holding mode 410, the actuator control module 310 may set the target throttle opening to a fully closed throttle opening. Setting the target throttle opening to the fully closed throttle opening may be performed to maintain the MAP at approximately the first predetermined pressure and below barometric pressure in anticipation of auto-starting the engine 102.

Despite the throttle valve 106 being fully closed, however, the MAP may increase toward barometric pressure. For example only, a MAP increase may be attributable to inflow through open intake and exhaust valves and/or through the throttle valve 106. Accordingly, the MAP may increase toward barometric pressure during the MAP holding mode 410.

When an auto-start command is generated by the auto-stop/start module 320, the mode control module 318 initiates an auto-start event. The mode control module 318 may start the engine (e.g., for an auto-start event or a vehicle startup command) by setting the control mode to the choking mode 414. The actuator control module 310 sets the target throttle opening to the fully closed throttle opening when the control mode is set to the choking mode 414. The actuator control module 310 may also crank the engine 102 via the starter 142 when the control mode is set to the choking mode.

Cranking the engine 102 while the throttle valve 106 is fully closed causes the MAP to decrease. The actuator control module 310 begins supplying fuel to the engine 102 during the choking mode 414. The actuator control module 310 sets the target spark timing for each combustion event that occurs after the control mode is transitioned to the choking mode 414.

The mode control module 318 may transition the control mode to the cranking airflow mode 418 when the MAP falls below a second predetermined pressure during the choking mode 414. The second predetermined pressure may be less than the first predetermined pressure. The actuator control module 310 may continue cranking the engine 102 during the cranking airflow mode 418.

The actuator control module 310 may set the target throttle opening based on the target engine speed during the cranking airflow mode 418. In other words, the actuator control module 310 selectively opens the throttle valve 106 during the cranking airflow mode 418 and allows airflow into the intake manifold 104 during the cranking airflow mode 418. The mode control module 318 may set the control mode to the speed control mode 422 after the cranking airflow mode 418.

The correction disabling module 322 selectively enables and disables the correction determination module 326 based on the control mode. More specifically, the correction disabling module 322 enables the correction determination module 326 when the control mode is set to the choking mode 414 or to the cranking airflow mode 418. Written conversely, the correction disabling module 322 may disable the correction determination module 326 when the control mode is set to the throttle holding mode 402, the manifold refill mode 406, or the MAP holding mode 410. In this manner, the correction disabling module 322 enables the correction determination module 326 when the engine 102 is started pursuant to a vehicle startup command or to an auto-start event.

The actuator control module 310 sets the target spark timing for each combustion event that occurs after the control mode is transitioned to the choking mode 414. The actuator control module 310 may determine the target spark timing based upon an inverse of a relationship between torque and the target spark timing. For example only, the actuator control module 310 may determine a target amount of torque and determine the target spark timing for one of the cylinders in a predetermined firing order based on the relationship:

$$S_T = T^{-1}(T_T, APC, I, E, AF, OT, \#),$$

where $S_T$ is the target spark timing, $T^{-1}$ is an inverse torque model, $T_T$ is the target torque, APC is the air per cylinder (APC), I and E are intake and exhaust phaser positions, respectively, AF corresponds to the air/fuel mixture, OT is the oil temperature, and # is the number of cylinders that will be capable of producing torque (i.e., supplied fuel) when the target spark timing is executed for the one of the cylinders. This relationship may be embodied as an equation and/or as a lookup table. The actuator control module 310 may determine the target torque based on, for example, the engine speed, the target engine speed, the driver torque request, one or more engine operating parameters, and/or other suitable parameters.

When enabled, the correction determination module 326 determines a spark timing correction based on the engine speed and the target engine speed. More specifically, the correction determination module 326 determines the spark timing correction based on a difference between the target engine speed and the engine speed.

The correction determination module 326 may determine the spark timing correction using a proportional control scheme based on the difference between the target engine speed and the engine speed. For example only, the correction determination module 326 may determine the spark timing correction using the equation:

$$\text{Correction} = k^*(\text{Target} - \text{Actual}),$$

where Correction is the spark timing correction, k is a proportional gain, Target is the target engine speed, and Actual is the engine speed.

The spark timing adjustment module 330 receives the target spark timing and the spark timing correction. The spark timing adjustment module 330 adjusts the target spark timing based on the spark timing correction and outputs an adjusted spark timing. For example only, the spark timing adjustment module 330 may determine the adjusted spark timing based on a sum of the spark timing correction and the target spark timing.

The spark timing adjustment module 330 may provide the adjusted spark timing to the spark actuator module 126. The spark actuator module 126 provides spark at the adjusted spark timing. In this manner, the spark timing is adjusted to shape the engine speed toward the target engine speed and to minimize overshoot and engine flare during engine startup.

While the principles of the present disclosure are discussed as relating to adjusting spark timing, the principles of the present disclosure are also applicable to adjusting fuel injection timing in compression-combustion engines. For example only, the fuel injection timing may be adjusted based on an injection timing correction that is determined based on the difference between the target engine speed and the engine speed in compression-combustion engine systems.

Figure 5:
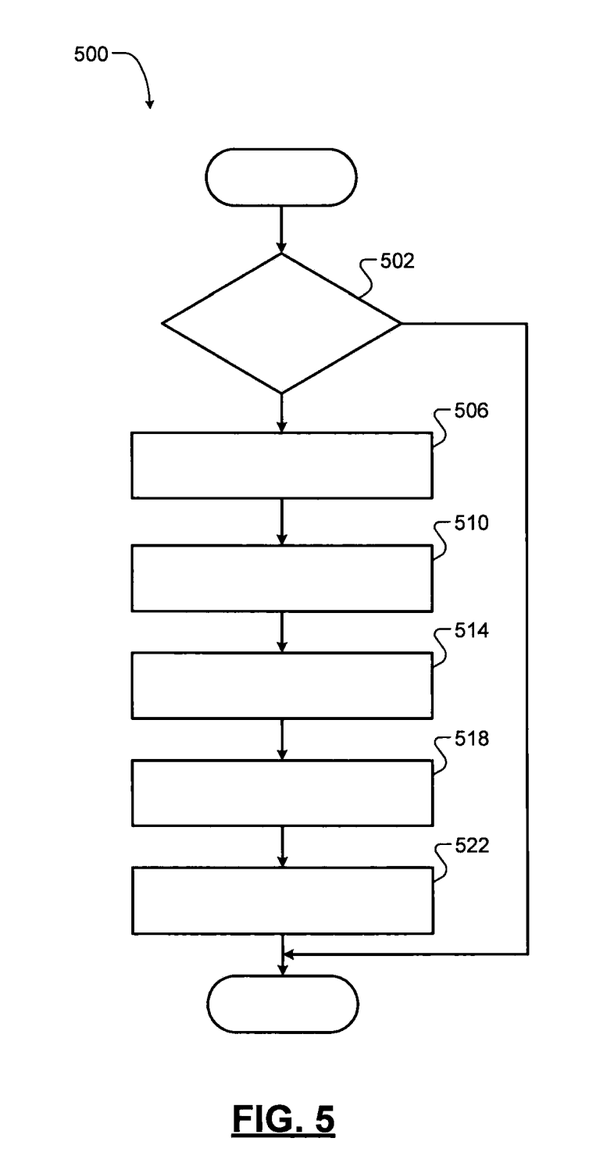
FIG. 5 is a flowchart depicting an exemplary method of controlling engine speed to minimize engine flare during an engine startup event according to the principles of the present disclosure.
Figure 6:
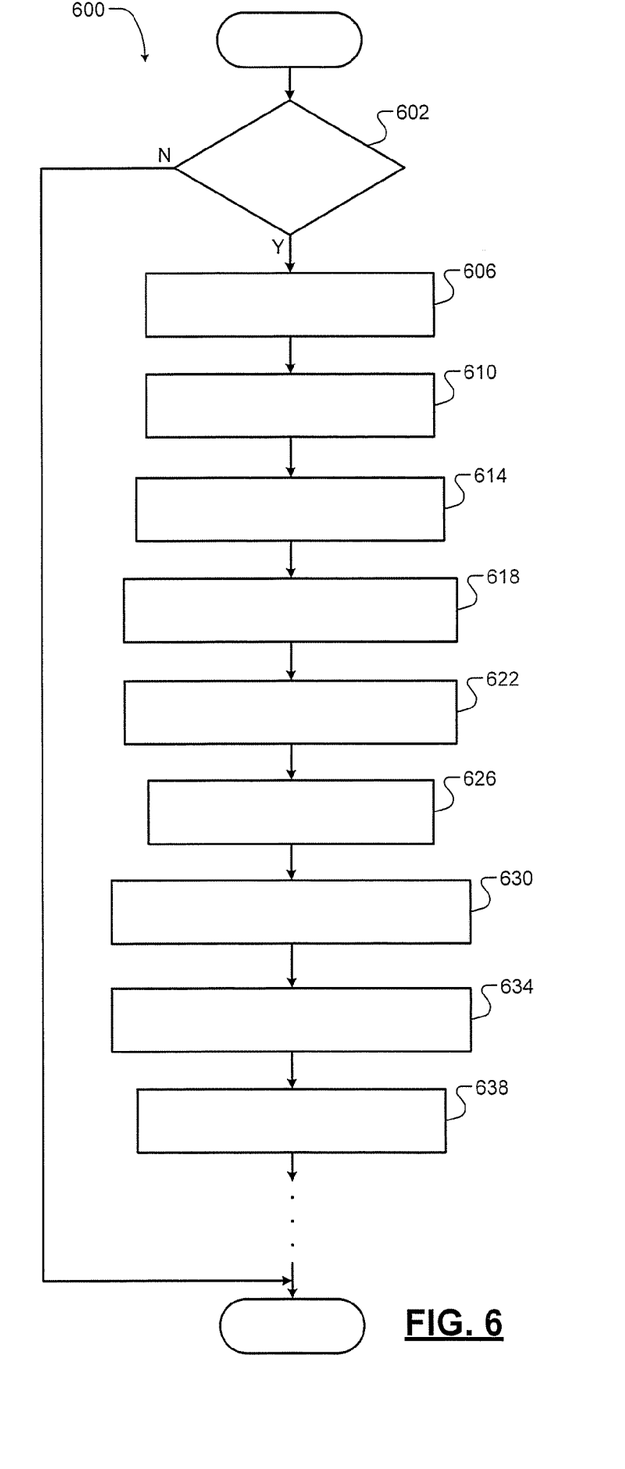

Referring now to FIG. 5, a flowchart depicting an exemplary method 500 of controlling engine speed to minimize engine flare during an engine startup event is presented. Control may begin with 502 where control determines whether engine startup should be initiated. If true, control may continue with 506; if false, control may end. Control may determine that an engine startup should be initiated, for example, when the control mode is transitioned to the choking mode or when a vehicle startup command is received.

At 506, control may determine the target engine speed. Control may crank the engine 102 via the starter 142 at 506. Control determines the target throttle opening, the target fueling, and the target spark timing at 510. Control may determine the target throttle opening based on the control mode and/or one or more suitable parameters. Control may determine the target fueling to achieve a stoichiometric air/fuel mixture. Control may set the target spark timing using the relationship described above.

Control determines the spark timing correction at 514. Control determines the spark timing correction based on the difference between the target engine speed and the engine speed. For example only, control may determine the spark timing correction using the equation:

$$\text{Correction} = k^*(\text{Target} - \text{Actual}),$$

where Correction is the spark timing correction, k is a proportional gain, Target is the target engine speed, and Actual is the engine speed.

At 518, control determines the adjusted spark timing. Control determines the adjusted spark timing based on the target spark timing and the spark timing correction. For example only, control may determine the adjusted spark timing based on the sum of the target spark timing and the spark timing correction. Control initiates combustion for a combustion event based on the adjusted spark timing at 522. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for an auto-stop/start vehicle, comprising:
an actuator control module that determines a target spark timing for a first time that is between a second time when engine cranking begins and a third time when a measured engine speed becomes greater than a predetermined engine speed after the second time;

a correction determination module that determines a spark timing correction for the first time based on a target engine speed and a measured engine speed; and a spark adjustment module that sets a spark timing for the first time based on the target spark timing and the spark timing correction.

2. The engine control system of claim 1 wherein the correction determination module determines the spark timing correction based on a difference between the target engine speed and the measured engine speed.

3. The engine control system of claim 2 wherein the correction determination module determines the spark timing correction based on a product of a proportional gain and the difference.

4. The engine control system of claim 1 wherein the spark adjustment module sets the spark timing based on a sum of the target spark timing and the spark timing correction.

5. The engine control system of claim 1 wherein the actuator control module selectively sets the target spark timing based on an inverse relationship between the target spark timing and torque.

6. The engine control system of claim 1 further comprising a mode control module that begins the engine cranking between a fourth time when an ignition system is activated and a fifth time when the ignition system is deactivated.

7. The engine control system of claim 1 further comprising a target engine speed module determines the target engine speed from a predetermined profile having zero engine overshoot.

8. The engine control system of claim 1 further comprising a target engine speed module that determines the target engine speed from a plurality of predetermined target engine speed profiles.

9. The engine control system of claim 8 wherein the target engine speed module selects one of the predetermined target engine speed profiles based on an engine oil temperature.

10. The engine control system of claim 8 wherein the target engine speed module selects one of the predetermined target engine speed profiles based on an accelerator pedal position and at least one engine operating parameter.

11. An engine control method for an auto-stop/start vehicle, comprising:
determining a target spark timing for a first time that is between a second time when engine cranking begins and a third time when a measured engine speed becomes greater than a predetermined engine speed after the second time;

determining a spark timing correction for the first time based on a target engine speed and a measured engine speed; and setting a spark timing for the first time based on the target spark timing and the spark timing correction.

12. The engine control method of claim 11 further comprising determining the spark timing correction based on a difference between the target engine speed and the measured engine speed.

13. The engine control method of claim 12 further comprising determining the spark timing correction based on a product of a proportional gain and the difference.

14. The engine control method of claim 11 further comprising setting the spark timing based on a sum of the target spark timing and the spark timing correction.

15. The engine control method of claim 14 further comprising selectively setting the target spark timing based on an inverse relationship between the target spark timing and torque.

16. The engine control method of claim 11 further comprising beginning the engine cranking between a fourth time when an ignition system is activated and a fifth time when the ignition system is deactivated.

17. The engine control method of claim 11 further comprising determining the target engine speed from a predetermined profile having zero engine overshoot.

18. The engine control method of claim 11 further comprising determining the target engine speed from a plurality of predetermined target engine speed profiles.

19. The engine control method of claim 18 further comprising determining the target engine speed based on an engine oil temperature.

20. The engine control method of claim 18 further comprising determining the target engine speed based on an accelerator pedal position and at least one engine operating parameter.

* * * * *